(12) United States Patent
Van Swearingen et al.

(10) Patent No.: US 8,747,152 B2
(45) Date of Patent: Jun. 10, 2014

(54) RF ISOLATED CAPACITIVELY COUPLED CONNECTOR

(71) Applicant: Andrew LLC, Hickory, NC (US)

(72) Inventors: Kendrick Van Swearingen, Woodridge, IL (US); Jeffrey Paynter, Momence, IL (US); Ronald Vaccaro, Shorewood, IL (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/791,123

(22) Filed: Mar. 8, 2013

(65) Prior Publication Data

US 2014/0134875 A1     May 15, 2014

Related U.S. Application Data

(63) Continuation-in-part of application No. 13/673,373, filed on Nov. 9, 2012, now Pat. No. 8,622,762, and a continuation-in-part of application No. 13/673,084, filed on Nov. 9, 2012, now Pat. No. 8,622,768.

(51) Int. Cl.
    *H01R 9/05*     (2006.01)

(52) U.S. Cl.
    USPC ............................................ 439/578; 439/950

(58) Field of Classification Search
    USPC ................... 439/578, 583–585, 950
    See application file for complete search history.

(56) References Cited

U.S. PATENT DOCUMENTS

| | | | |
|---|---|---|---|
| 2,516,529 A | 7/1950 | Raymond | |
| 3,617,607 A | 11/1971 | Williams | |
| 3,980,976 A | 9/1976 | Tadama et al. | |
| 4,227,765 A | * 10/1980 | Neumann et al. | 439/248 |
| 4,333,697 A | 6/1982 | Dreyer | |
| 4,336,974 A | 6/1982 | Wilson | |
| 4,397,515 A | 8/1983 | Russell | |
| 4,399,419 A | 8/1983 | Dobrovolny | |
| 4,580,862 A | 4/1986 | Johnson | |
| 4,586,008 A | 4/1986 | Raleigh | |
| 4,697,859 A | 10/1987 | Fisher, Jr. | |
| 4,789,351 A | 12/1988 | Fisher, Jr. et al. | |
| 4,815,986 A | 3/1989 | Dholoo | |
| 4,884,982 A | 12/1989 | Fleming et al. | |
| 4,921,435 A | 5/1990 | Kane et al. | |
| 4,934,960 A | * 6/1990 | Capp et al. | 439/620.09 |

(Continued)

OTHER PUBLICATIONS

Gon Sung Kim, International Search Report for PCT/US13/59392, Dec. 23, 2013, Daejeon Metropolitan City, Republic of Korea.

(Continued)

*Primary Examiner* — Ross Gushi
(74) *Attorney, Agent, or Firm* — Babcock IP, PLLC

(57) ABSTRACT

A connector with a capacitively coupled connector interface for interconnection with a female portion is provided with an annular groove, with a sidewall, open to an interface end of the female portion. A male portion is provided with a male outer conductor coupling surface at an interface end, covered by an outer conductor dielectric spacer. A waveguide path between the male outer conductor coupling surface and the female portion, while in the interlocked position, extends from the outer conductor dielectric spacer to an exterior of the interconnection through an S-bend in a radial direction, to improve RF isolation. The male outer conductor coupling surface is dimensioned to seat, spaced apart from the sidewall by the outer conductor dielectric spacer, within the annular groove, when the male portion and the female portion are in an interlocked position.

20 Claims, 19 Drawing Sheets

(56) References Cited

U.S. PATENT DOCUMENTS

| | | | |
|---|---|---|---|
| 4,943,245 A | 7/1990 | Lincoln | |
| 5,073,761 A | 12/1991 | Waterman et al. | |
| 5,276,415 A | 1/1994 | Lewandowski et al. | |
| 5,327,111 A | 7/1994 | Gipprich | |
| 5,329,262 A | 7/1994 | Fisher, Jr. | |
| 5,383,790 A | 1/1995 | Kerek et al. | |
| 5,552,959 A | 9/1996 | Penniman et al. | |
| 5,558,541 A | 9/1996 | Botka et al. | |
| 5,659,889 A | 8/1997 | Cockson | |
| 5,769,652 A | 6/1998 | Wider | |
| 5,796,315 A | 8/1998 | Gordon et al. | |
| 5,944,548 A | 8/1999 | Saito | |
| 5,977,841 A * | 11/1999 | Lee et al. | 333/24 C |
| 5,980,290 A | 11/1999 | Meynier et al. | |
| 5,997,328 A | 12/1999 | Kodama et al. | |
| 6,173,605 B1 | 1/2001 | Rankin | |
| 6,343,958 B1 | 2/2002 | Wayman | |
| 6,409,550 B1 | 6/2002 | Splichal et al. | |
| 6,496,353 B1 | 12/2002 | Chio | |
| 6,544,062 B1 | 4/2003 | Loveless et al. | |
| 6,558,177 B2 | 5/2003 | Havener et al. | |
| 6,679,726 B1 | 1/2004 | Tunn et al. | |
| 6,683,254 B1 | 1/2004 | Gunnels | |
| 6,778,044 B2 * | 8/2004 | Fehrenbach et al. | 333/260 |
| 6,798,310 B2 | 9/2004 | Wong et al. | |
| 6,853,337 B2 | 2/2005 | Barabash | |
| 6,926,555 B2 | 8/2005 | Nelson | |
| 7,077,697 B2 | 7/2006 | Kooiman | |
| 7,121,857 B1 | 10/2006 | Lewis | |
| 7,255,615 B2 | 8/2007 | Woelfl et al. | |
| 7,347,727 B2 * | 3/2008 | Wlos et al. | 439/578 |
| 7,479,034 B2 * | 1/2009 | Blakborn et al. | 439/578 |
| 7,563,133 B2 * | 7/2009 | Stein | 439/578 |
| 7,625,226 B1 | 12/2009 | Gastineau | |
| 7,628,628 B2 | 12/2009 | Matsuda et al. | |
| 7,922,529 B1 * | 4/2011 | Meurer | 439/578 |
| 8,157,598 B2 | 4/2012 | Niitsu | |
| 8,174,132 B2 | 5/2012 | Van Swearingen | |
| 8,231,398 B2 | 7/2012 | Rosenberger | |
| 8,302,296 B2 * | 11/2012 | Van Swearingen | 29/828 |
| 8,479,383 B2 * | 7/2013 | Van Swearingen et al. | 29/828 |
| 8,622,762 B2 * | 1/2014 | Van Swearingen et al. | 439/248 |
| 8,622,768 B2 * | 1/2014 | Van Swearingen et al. | 439/578 |
| 2003/0137372 A1 | 7/2003 | Fehrenbach et al. | |
| 2005/0164552 A1 * | 7/2005 | Wlos et al. | 439/578 |
| 2008/0081502 A1 | 4/2008 | Qu | |
| 2010/0124839 A1 | 5/2010 | Montena | |
| 2012/0129375 A1 * | 5/2012 | Van Swearingen | 439/314 |
| 2012/0129391 A1 * | 5/2012 | Van Swearingen et al. | 439/578 |
| 2012/0184135 A1 * | 7/2012 | Paynter et al. | 439/584 |
| 2012/0214339 A1 | 8/2012 | Stein | |
| 2012/0302088 A1 * | 11/2012 | Van Swearingen et al. | 439/378 |
| 2013/0038412 A1 * | 2/2013 | Moe et al. | 333/238 |
| 2013/0065415 A1 * | 3/2013 | Van Swearingen et al. | 439/247 |
| 2013/0065420 A1 * | 3/2013 | Van Swearingen et al. | 439/372 |
| 2013/0065422 A1 * | 3/2013 | Van Swearingen et al. | 439/378 |

OTHER PUBLICATIONS

Sun Gon Kim, International Search Report of PCT/US2013/059848, Jan. 28, 2014, Daejeon Metropolitan City, Republic of Korea.

* cited by examiner

RF ISOLATED CAPACITIVELY COUPLED CONNECTOR

BACKGROUND

1. Field of the Invention

This invention relates to electrical cable connectors. More particularly, the invention relates to connectors with a capacitively coupled connection interface with improved RF isolation.

2. Description of Related Art

Coaxial cables are commonly utilized in RF communications systems. Coaxial cable connectors may be applied to terminate coaxial cables, for example, in communication systems requiring a high level of precision and reliability.

Connector interfaces provide a connect and disconnect functionality between a cable terminated with a connector bearing the desired connector interface and a corresponding connector with a mating connector interface mounted on an apparatus or a further cable. Prior coaxial connector interfaces typically utilize a retainer provided as a threaded coupling nut which draws the connector interface pair into secure electro-mechanical engagement as the coupling nut, rotatably retained upon one connector, is threaded upon the other connector.

Passive Intermodulation Distortion (PIM) is a form of electrical interference/signal transmission degradation that may occur with less than symmetrical interconnections and/or as electro-mechanical interconnections shift or degrade over time, for example due to mechanical stress, vibration, thermal cycling, and/or material degradation. PIM is an important interconnection quality characteristic as PIM generated by a single low quality interconnection may degrade the electrical performance of an entire RF system.

Recent developments in RF coaxial connector design have focused upon reducing PIM by improving interconnections between the conductors of coaxial cables and the connector body and/or inner contact, for example by applying a molecular bond instead of an electro-mechanical interconnection, as disclosed in commonly owned US Patent Application Publication 2012/0129391, titled "Connector and Coaxial Cable with Molecular Bond Interconnection", by Kendrick Van Swearingen and James P. Fleming, published on 24 May 2012 and hereby incorporated by reference in its entirety.

Connection interfaces may be provided with a blind mate characteristic to enable push-on interconnection wherein physical access to the connector bodies is restricted and/or the interconnected portions are linked in a manner where precise alignment is not cost effective, such as between an antenna and a transceiver that are coupled together via a swing arm or the like. To accommodate mis-alignment, a blind mate connector may be provided with lateral and/or longitudinal spring action to accommodate a limited degree of insertion mis-alignment. Prior blind mate connector assemblies may include one or more helical coil springs, which may increase the complexity of the resulting assembly and/or require additional assembly depth along the longitudinal axis.

Competition in the cable connector market has focused attention on improving interconnection performance and long term reliability of the interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventors have recognized that PIM may be generated at, in addition to the interconnections between the inner and outer conductors of a coaxial cable and each coaxial connector, the electrical interconnections between the connector interfaces of mating coaxial connectors.

Further, threaded interconnection interfaces may be difficult to connect in high density/close proximity connector situations where access to the individual connector bodies is limited. Even where smaller diameter cables are utilized, standard quick connection interfaces such as BNC-type interconnections may provide unsatisfactory electrical performance with respect to PIM, as the connector body may pivot laterally along the opposed dual retaining pins and internal spring element, due to the spring contact applied between the male and female portions, according to the BNC interface specification. Further, although BNC-type interconnections may be quick connecting, the requirement of twist-engaging the locking collar prevents use of this connection interface where a blind mate is desired.

Figure 1:
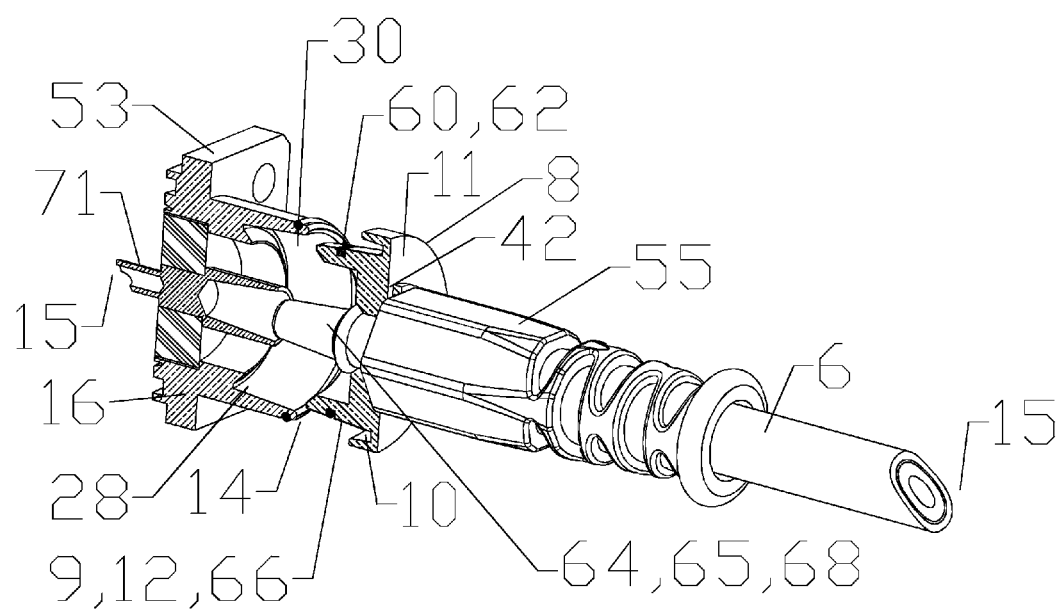
FIG. 1 is a schematic angled isometric view of an exemplary embodiment of a connector with a capacitively coupled blind mate interconnection interface, showing a male portion aligned for coupling with a female portion.
Figure 2:
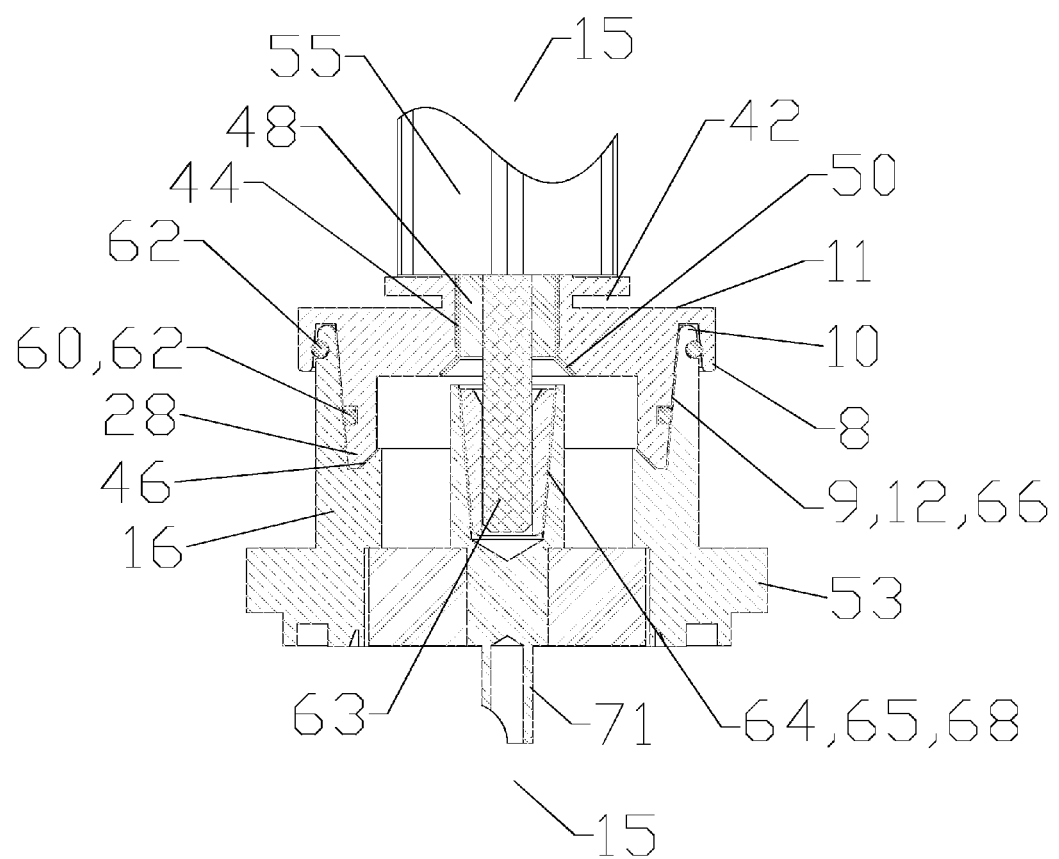
FIG. 2 is a schematic partial cut-away side view of the connector of FIG. 1, demonstrated with the male portion and the female portion in the interlocked position.

An exemplary embodiment of a blind mate connector interface, as shown in FIGS. 1-2, demonstrates a rigid connector interface where the male and female portions 8, 16 seat together along self-aligning generally conical mating surfaces at the interface end 14 of each.

One skilled in the art will appreciate that interface end 14 and cable end 15 are applied herein as identifiers for respective ends of both the connector and also of discrete elements of the connector assembly described herein, to identify same and their respective interconnecting surfaces according to their alignment along a longitudinal axis of the connector between an interface end 14 and a cable end 15 of each of the male and female portions 8, 16. When interconnected by the connector interface, the interface end 14 of the male portion 8 is coupled to the interface end 14 of the female portion 16.

The male portion 8 has a male outer conductor coupling surface 9, here demonstrated as a conical outer diameter seat surface 12 at the interface end 14 of the male portion 8. The male portion 8 is demonstrated coupled to a cable 6, an outer conductor 44 of the cable 6 inserted through a bore 48 of the male portion at the cable end 15 and coupled to a flare surface 50 at the interface end of the bore 48.

The female portion 16 is provided with an annular groove 28 open to the interface end 14. An outer sidewall 30 of the annular groove 28 is dimensioned to mate with the conical outer diameter seat surface 12 enabling self-aligning conical surface to conical surface mutual seating between the male and female portions 8, 16.

The male portion may further include a peripheral groove 10, open to the interface end 14, the peripheral groove 10 dimensioned to receive an outer diameter of the interface end 14 of the female portion 16. Thereby, the male outer conductor coupling surface 9 may extend from the peripheral groove 10 to portions of the male portion 8 contacting an inner sidewall 46 of the female portion 16, significantly increasing the surface area available for the male outer conductor coupling surface 9.

A polymeric support 55 may be sealed against a jacket of the cable 6 to provide both an environmental seal for the cable end 15 of the interconnection and a structural reinforcement of the cable 6 to male portion 8 interconnection.

An environmental seal may be applied by providing an annular seal groove 60 in the outer diameter seat surface 12, in which a seal 62 such as an elastometric o-ring or the like may be seated. Because of the conical mating between the outer diameter seat surface 12 and the outer side wall 30, the seal 62 may experience reduced insertion friction compared to that encountered when seals are applied between telescoping cylindrical surfaces, enabling the seal 62 to be slightly over-sized, which may result in an improved environmental seal between the outer diameter seat surface 12 and the outer side wall 30. A further seal 62 may be applied to an outer diameter of the female portion 16, for sealing against the outer sidewall of the peripheral groove 10, if present.

Where the connection interface selected requires an inner conductor profile that is not compatible with the inner conductor 63 of the selected cable 6 and/or the material of the inner conductor 63 is an undesired inner conductor connector interface material, such as aluminum, the inner conductor 63 may be provided with a desired male inner conductor surface 65 at the interface end of the male portion 8 by applying an inner conductor cap 64.

The connection interface may be applied with conventional "physical contact" galvanic electro-mechanical coupling. To further eliminate PIM generation also with respect to the connection interface between the coaxial connectors, the connection interface may be enhanced to utilize capacitive coupling.

Capacitive coupling may be obtained by applying a dielectric spacer between the inner and/or outer conductor contacting surfaces of the connector interface. Capacitive coupling between spaced apart conductor surfaces eliminates the direct electrical current interconnection between these surfaces that is otherwise subject to PIM generation/degradation as described hereinabove with respect to cable conductor to connector interconnections.

One skilled in the art will appreciate that a capacitive coupling interconnection may be optimized for a specific operating frequency band. For example, the level of capacitive coupling between separated conductor surfaces is a function of the desired frequency band(s) of the electrical signal (s), the surface area of the separated conductor surfaces, the dielectric constant of a dielectric spacer and the thickness of the dielectric spacer (distance between the separated conductor surfaces).

The dielectric spacer may be applied, for example as shown in FIGS. 1 and 2, with respect to the outer conductor 44 as an outer conductor dielectric spacer 66 by covering at least the interface end 14 of the male outer conductor coupling surface 9 of the male portion 18 (the seating surface 12) with a dielectric coating. Similarly, the male inner conductor coupling surface 65, here the outer diameter of the inner conductor cap 64, may be covered with a dielectric coating to form an inner conductor dielectric spacer 68.

Alternatively and/or additionally, as known equivalents, the outer and inner conductor dielectric spacers 66, 68 may be applied to the applicable areas of the annular groove 28 and/or the inner conductor contact 71. Thereby, when the male portion 8 is secured within a corresponding female portion 16, an entirely capacitively coupled interconnection interface is formed. That is, there is no direct galvanic interconnection between the inner conductor or outer conductor electrical pathways across the connection interface.

The dielectric coatings of the outer and inner conductor dielectric spacers 66, 68 may be provided, for example, as a ceramic or polymer dielectric material. One example of a dielectric coating with suitable compression and thermal resistance characteristics that may be applied with high precision at very thin thicknesses is ceramic coatings. Ceramic coatings may be applied directly to the desired surfaces via a range of deposition processes, such as Physical Vapor Deposition (PVD) or the like. Ceramic coatings have a further benefit of a high hardness characteristic, thereby protecting the coated surfaces from damage prior to interconnection and/or resisting thickness variation due to compressive forces present upon interconnection. The ability to apply extremely thin dielectric coatings, for example as thin as 0.5 microns, may reduce the surface area requirement of the separated conductor surfaces, enabling the overall dimensions of the connection interface to be reduced.

The inner conductor dielectric spacer 68 covering the male inner conductor surface here provided as the inner conductor cap 64 is demonstrated as a conical surface in FIGS. 1 and 2. The conical surface, for example applied at a cone angle corresponding to the cone angle of the male outer conductor coupling surface (conical seat surface 12), may provide an increased interconnection surface area and/or range of initial insertion angles for ease of initiating the interconnection and/or protection of the inner and outer conductor dielectric spacers 68,66 during initial mating for interconnection.

The exemplary embodiments are demonstrated with respect to a cable 6 that is an RF-type coaxial cable. One skilled in the art will appreciate that the connection interface may be similarly applied to any desired cable 6, for example multiple conductor cables, power cables and/or optical cables, by applying suitable conductor mating surfaces/individual conductor interconnections aligned within the bore 48 of the male and female portions 8, 16.

One skilled in the art will further appreciate that the connector interface provides a quick-connect rigid interconnection with a reduced number of discrete elements, which may simplify manufacturing and/or assembly requirements. Contrary to conventional connection interfaces featuring threads, the conical aspect of the seat surface 12 is generally self-aligning, allowing interconnection to be initiated without precise initial male to female portion 8, 16 alignment along the longitudinal axis.

Further blind mating functionality may be applied by providing the male portion 8 with a range of radial movement with respect to a longitudinal axis of the male portion 8. Thereby, slight misalignment between the male and female portions 8, 16 may be absorbed without binding the mating and/or damaging the male inner and outer conductor mating surfaces 65, 9 during interconnection.

Figure 3:
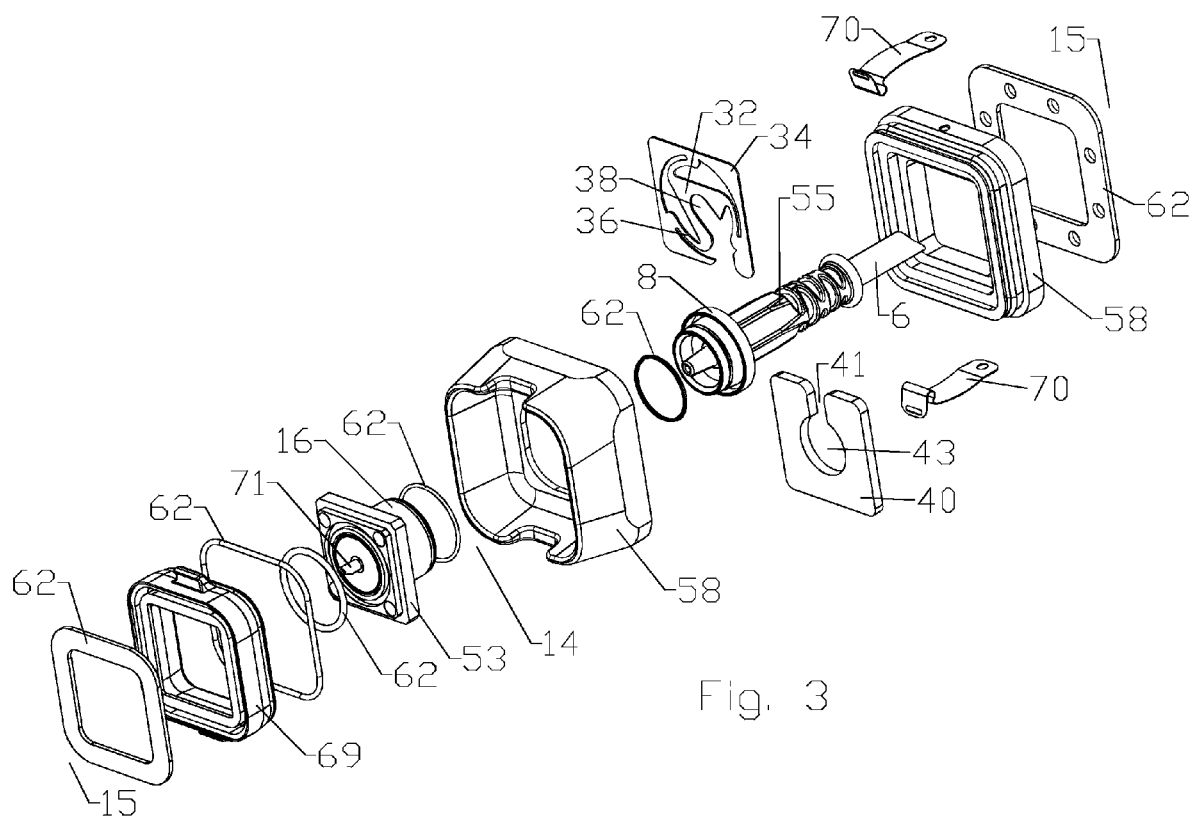
FIG. 3 is a schematic exploded isometric view of the connector of FIG. 1, with a blind mate retention assembly.
Figure 4:
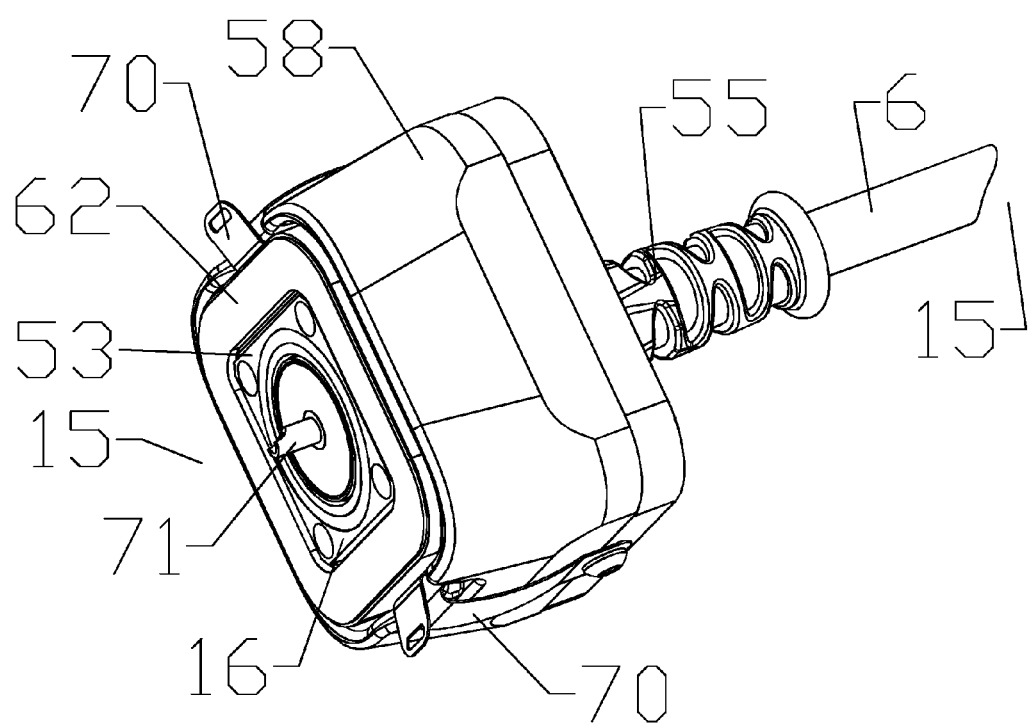
FIG. 4 is a schematic isometric external view of the connector and blind mate retention assembly of FIG. 3, in the interlocked position.
Figure 5:
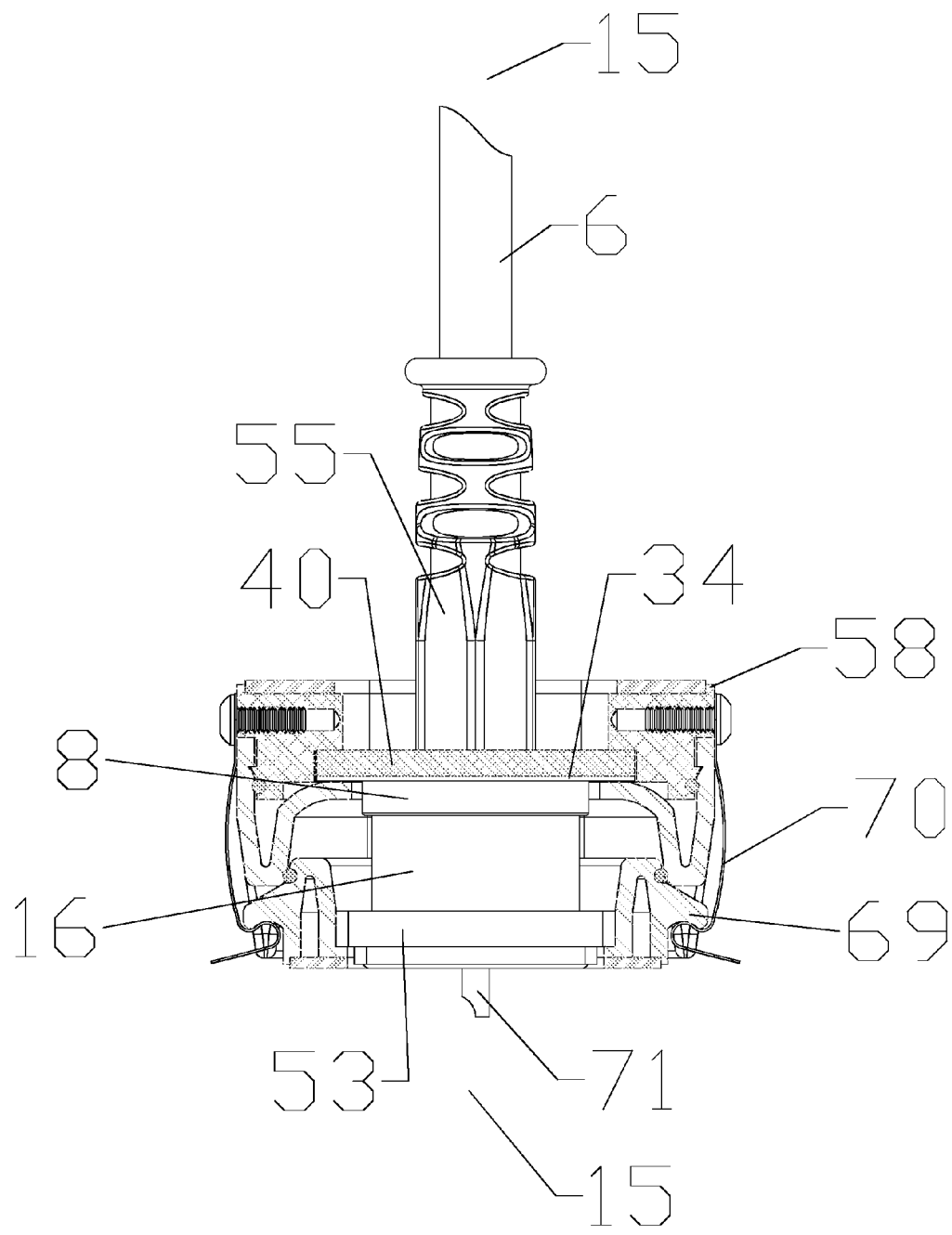
FIG. 5 is a schematic partial cut-away side view of the connector and blind mate retention assembly of FIG. 3.

As shown for example in FIGS. 3 and 5, male portion radial movement with respect to the female portion 16 may be enabled by providing the male portion 8 supported radially movable upon a bias web 32 of a float plate 34, with respect to a retaining structure that holds the male portion 8 and the female portion 16 in the mated/interlocked position.

Figure 6:
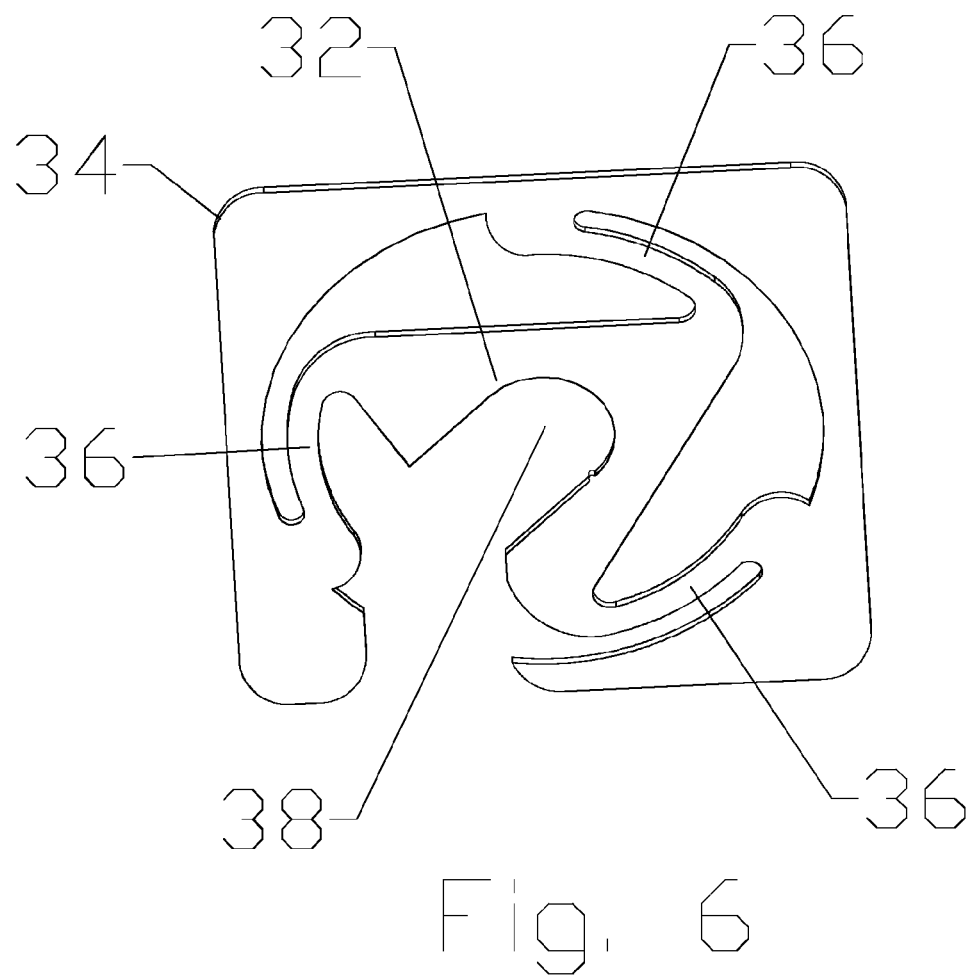
FIG. 6 is a schematic isometric view of a float plate of the blind mate retention assembly of FIG. 3.

As best shown in FIG. 6, the float plate 34 may be provided as a planar element with the bias web 32 formed therein by a plurality of circuitous support arms 36. The support arms 36, here demonstrated as three support arms 36, may be provided generally equidistant from one another, here for example separated from one another by one hundred and twenty degrees. A bias web slot 38 may be provided between two of the support arms 36 for inserting the male portion 8 into the bias web 32. The bias web slot 38 mates with a retention groove 42 formed in the outer diameter of the male portion 8 (see FIG. 2).

One skilled in the art will appreciate that the circuitous support arms 36 together form a spring biased to retain a male portion 8 seated in the bias web slot 38 central within the bias web 32 but with a range of radial movement. The level of spring bias applied is a function of the support arm cross-section and characteristics of the selected float plate material, for example stainless steel. The planar characteristic of the float plate 34 enables cost efficient precision manufacture by stamping, laser cutting or the like.

As best shown in FIG. 3, a shoulder plate 40 is provided seated against a cable end 15 of the float plate 34. The shoulder plate 40 is provided with a shoulder slot 41 dimensioned to receive a cable 6 coupled to the male portion 8. A proximal end of the shoulder slot 41 is provided with a connector aperture 43 dimensioned to receive a cable end 15 of the male portion 8 and allow the range or radial movement therein. As best shown in FIG. 2, the male portion 8 has a stop shoulder 11 with an outer diameter greater than the connector aperture 43, inhibiting passage of the stop shoulder 11 therethrough. Thereby, the float plate 34 is sandwiched between the stop shoulder 11 and the shoulder plate 40, inhibiting movement of the male portion 8 toward the cable end 15 of the shoulder plate 40, away from interconnection with the female portion 16, but enabling the range of radial movement.

The float plate 34 and shoulder plate 40 are retained against one another by an overbody 58. The overbody 58 (formed as a unitary element or alternatively as an assembly comprising a frame, retaining plate and sealing portion), may be dimensioned to seat against a base 69 coupled to the female portion 16, coupling the float plate 34 to the female portion 16 to retain the male portion 8 and the female portion 16 in the interlocked position via at least one retainer 70, such as at least one clip coupled to the overbody that releasably engages the base 69. The base 69 may be formed integrally with the female portion 16 or as an additional element, for example sandwiched between a mounting flange 53 of the female portion 16 and a bulkhead surface the female portion 16 may be mounted upon. The overbody and/or base may be cost efficiently formed with high precision of polymeric material with a dielectric characteristic, maintaining a galvanic break between the male portion 8 and the female portion 16. The seating of the overbody 58 against the base 69 may be environmentally sealed by applying one or more seals 62 between mating surfaces. A further seal member (not shown) may be applied to improve an environmental seal along a path past the shoulder and float plates 40, 34 associated with each male portion 8 and cable 6 extending therethrough.

Figure 7:
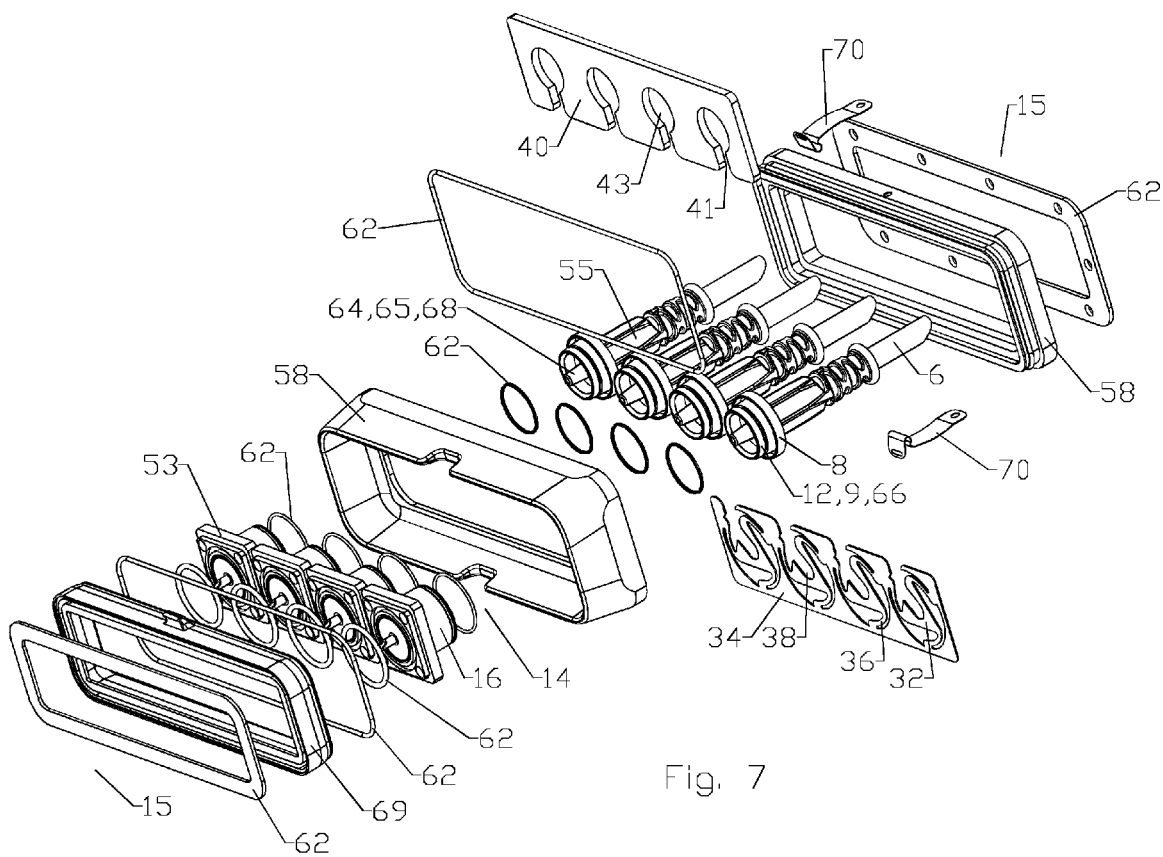
FIG. 7 is a schematic exploded isometric view of an exemplary four connector embodiment, with individual female portions and a blind mate assembly.
Figure 8:
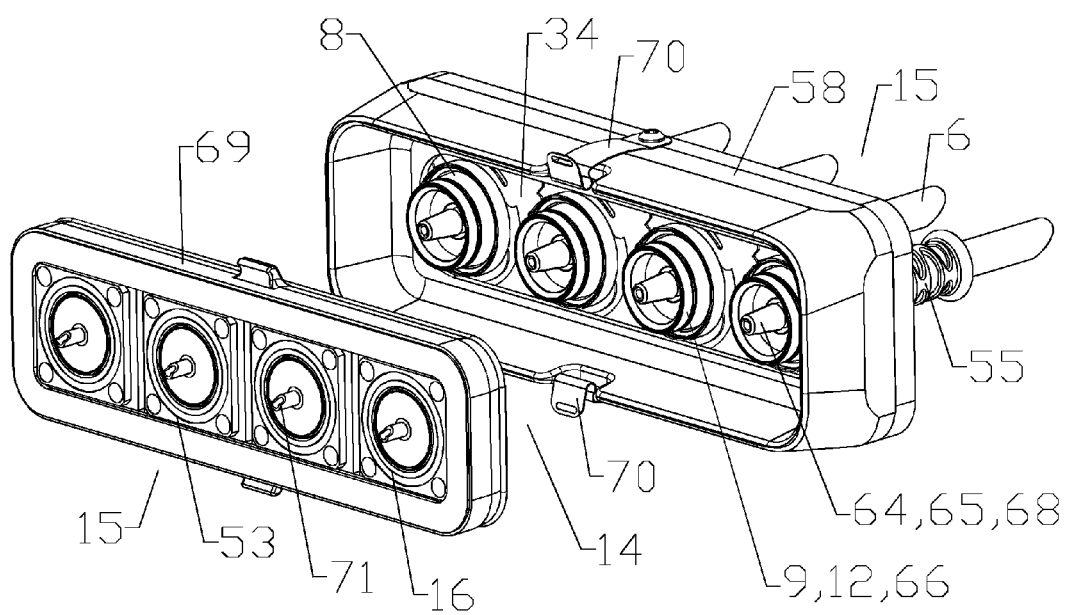
FIG. 8 is a schematic isometric view of the connector of FIG. 7, aligned for interconnection.
Figure 9:
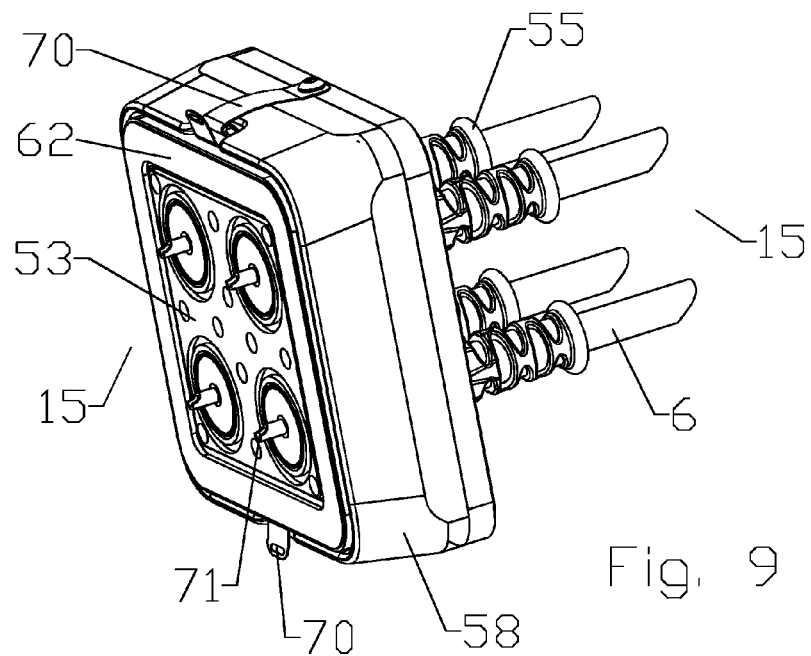
FIG. 9 is a schematic isometric view of another exemplary four connector embodiment in the interlocked position, with female portions with a monolithic mounting flange.
Figure 10:
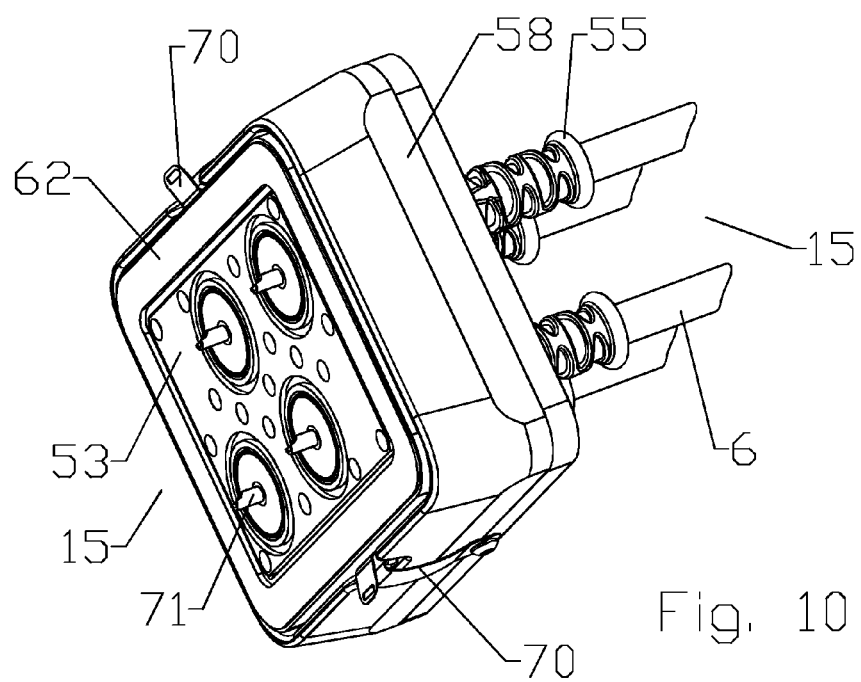
FIG. 10 is a schematic isometric view of another exemplary four connector embodiment in the interlocked position, with female portions with a monolithic mounting flange.
Figure 11:
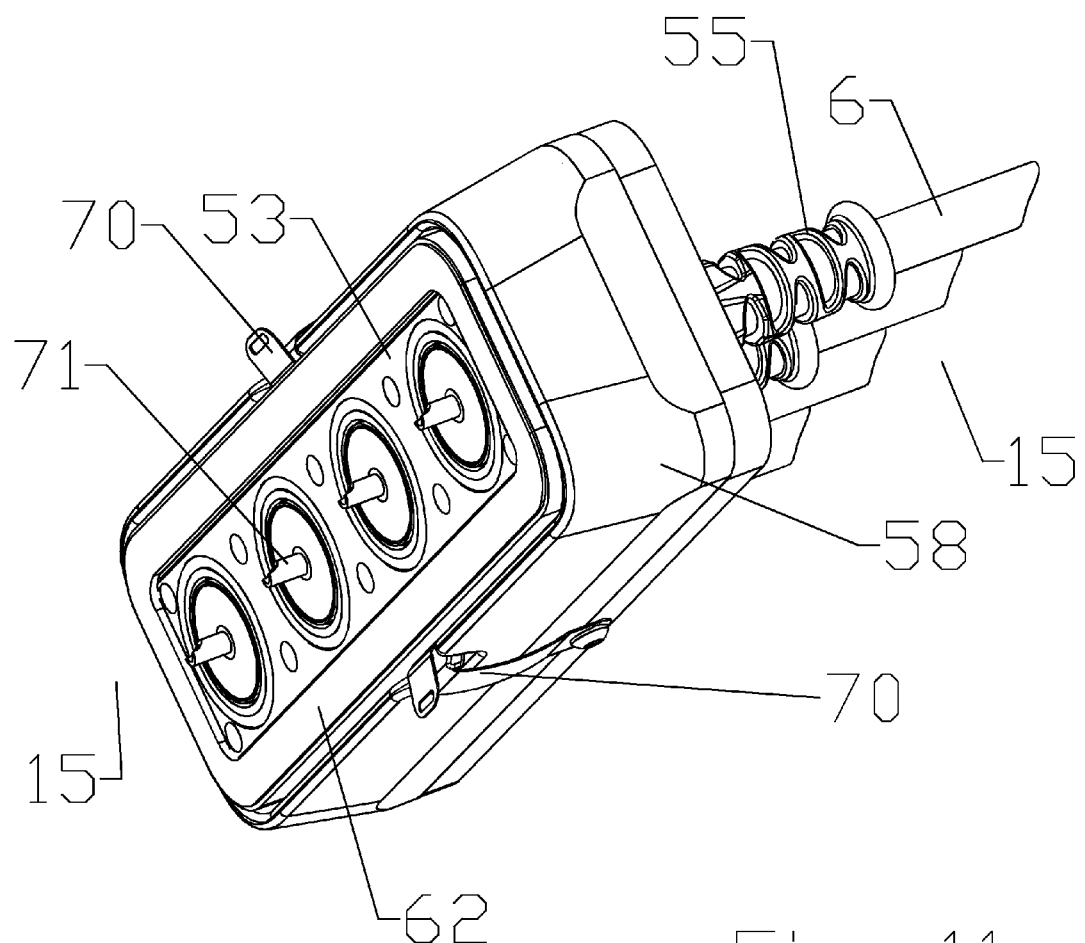
FIG. 11 is a schematic isometric view of another exemplary four connector embodiment in the interlocked position, with female portions with a monolithic mounting flange.
Figure 12:
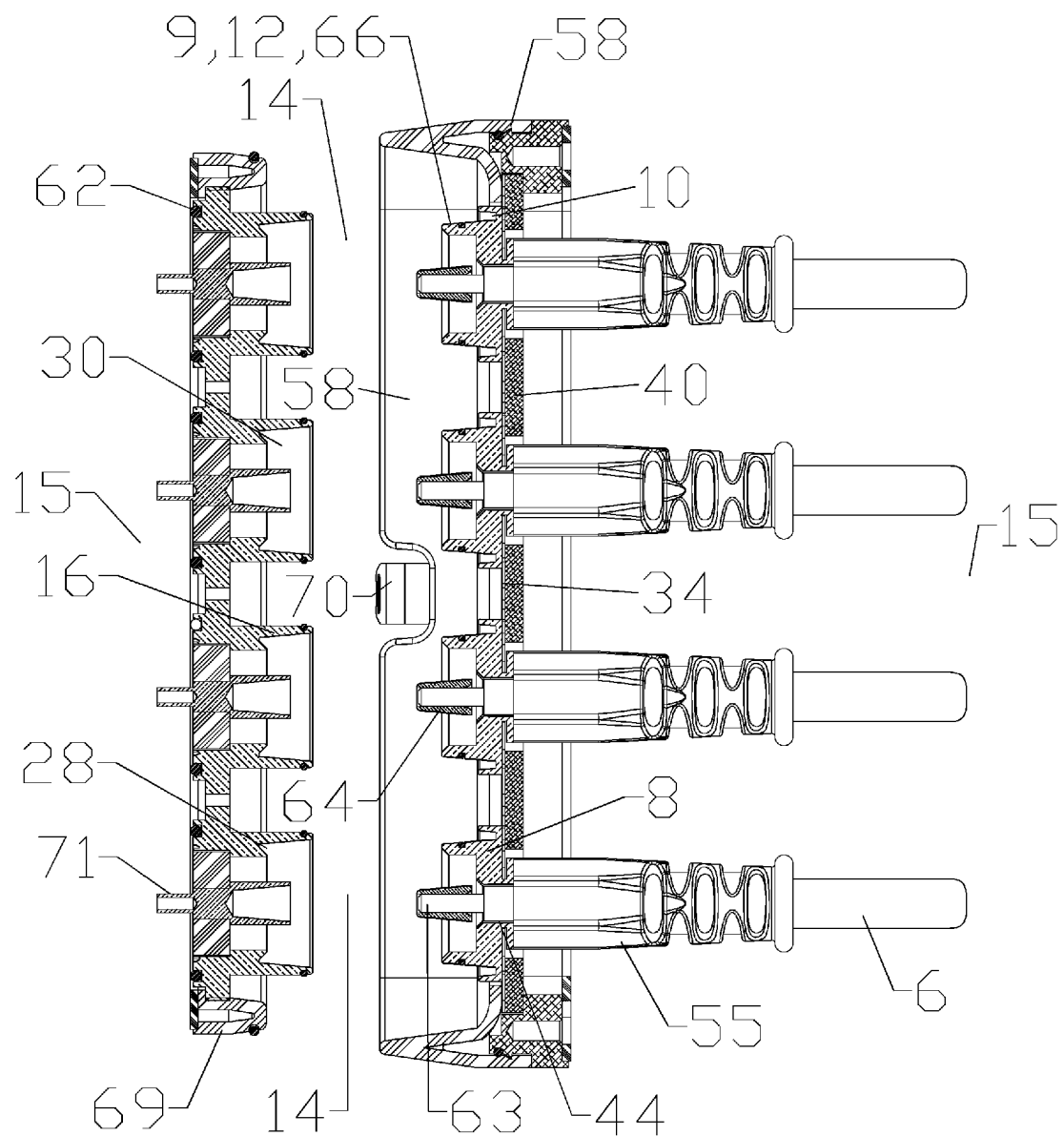
FIG. 12 is a schematic partial cut-away side view of the connector of FIG. 11, aligned for interconnection.
Figure 13:
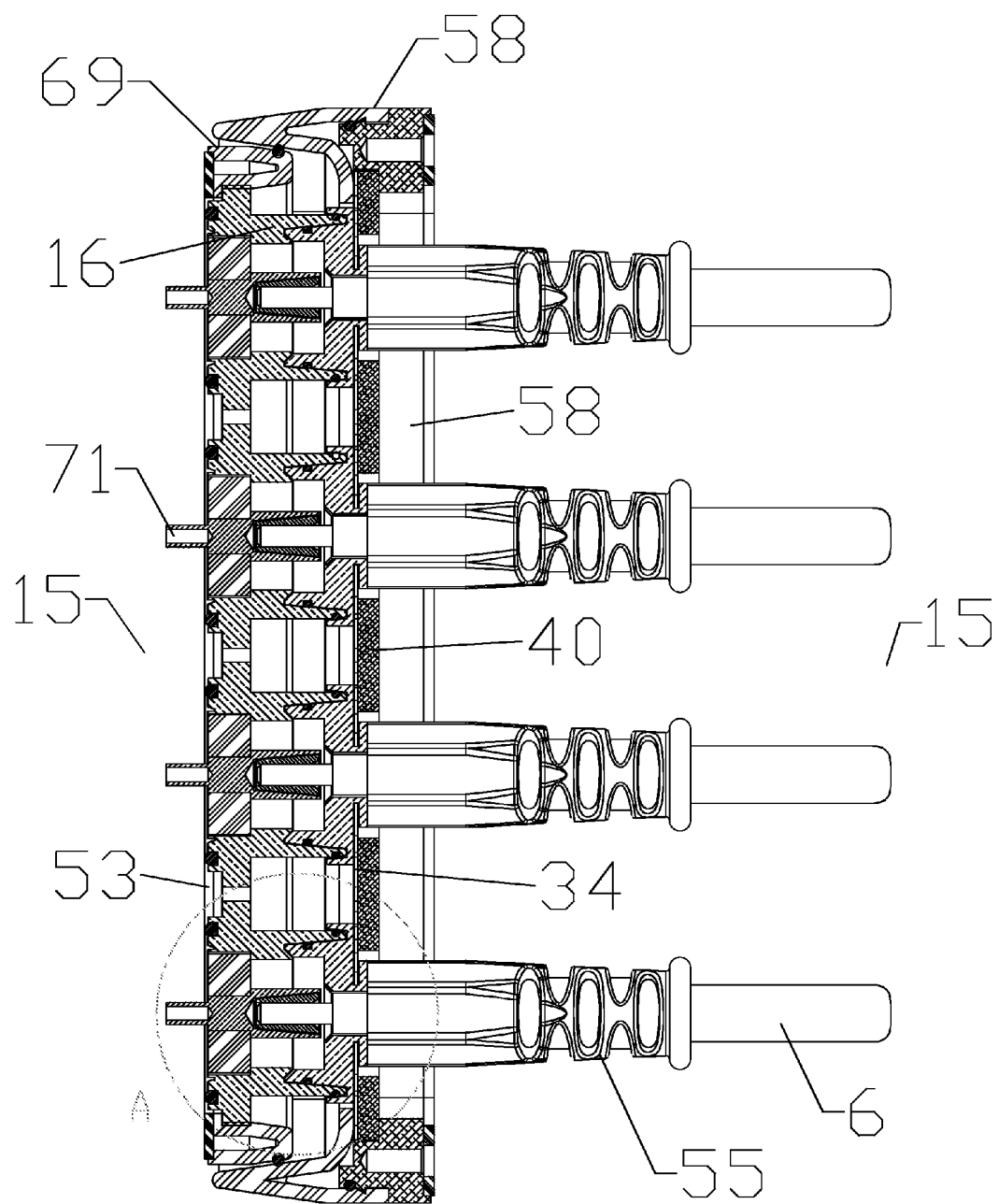
FIG. 13 is a schematic partial cut-away side view of the connector of FIG. 11, in the interlocked position.
Figure 14:
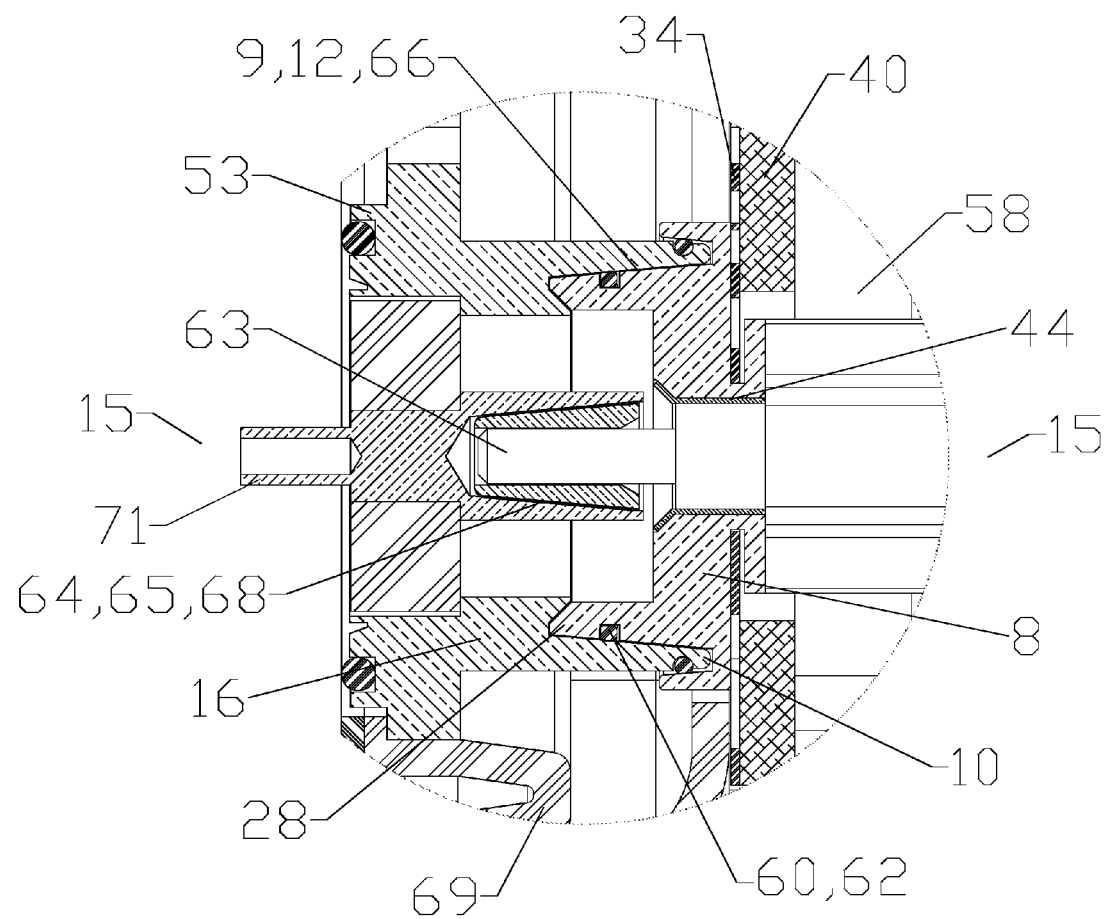
FIG. 14 is a close-up view of area A of FIG. 13.

One skilled in the art will appreciate that a combined assembly may be provided with multiple male portions 8 and a corresponding number of female portions 16, the male portions 8 seated within a multiple bias web float plate 34 and multiple connector aperture shoulder plate 40. For example as shown in FIGS. 7 and 8, the male portions may be arranged in a single row. Alternatively, the male portions may be arranged in a plurality of rows, in either columns (FIG. 8) or a staggered configuration (FIG. 9). The corresponding female portions may be provided as individual female portions each seated within the base (FIGS. 6 and 7) or formed with an integral mounting flange 53 (FIGS. 10-13) and/or base.

One skilled in the art will appreciate that the outer conductor dielectric spacer 66 creates a separation between the male and female portions 8, 16 which may form a waveguide path for RF signal leakage from the signal space along and/or between the inner and outer conductors 63, 44 to the exterior of the interconnection. Thereby, RF interference may occur, either into or out of the interconnection, for example where multiple interconnections are applied in close quarters and/or where microwave frequencies are in use.

The inventors have recognized that waveguide path RF propagation may be frustrated by introducing significant direction changes along the waveguide path.

Figure 15:
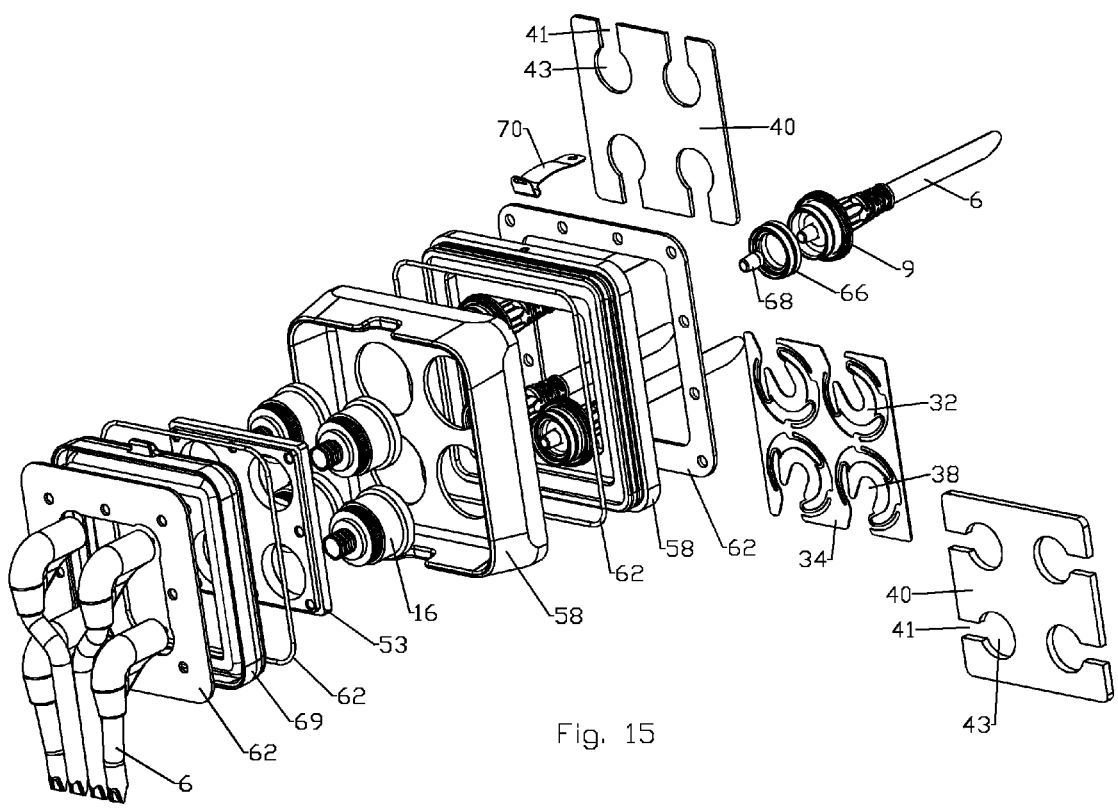
FIG. 15 is a schematic exploded isometric view of an exemplary four connector embodiment, with an S-bend for RF isolation.
Figure 16:
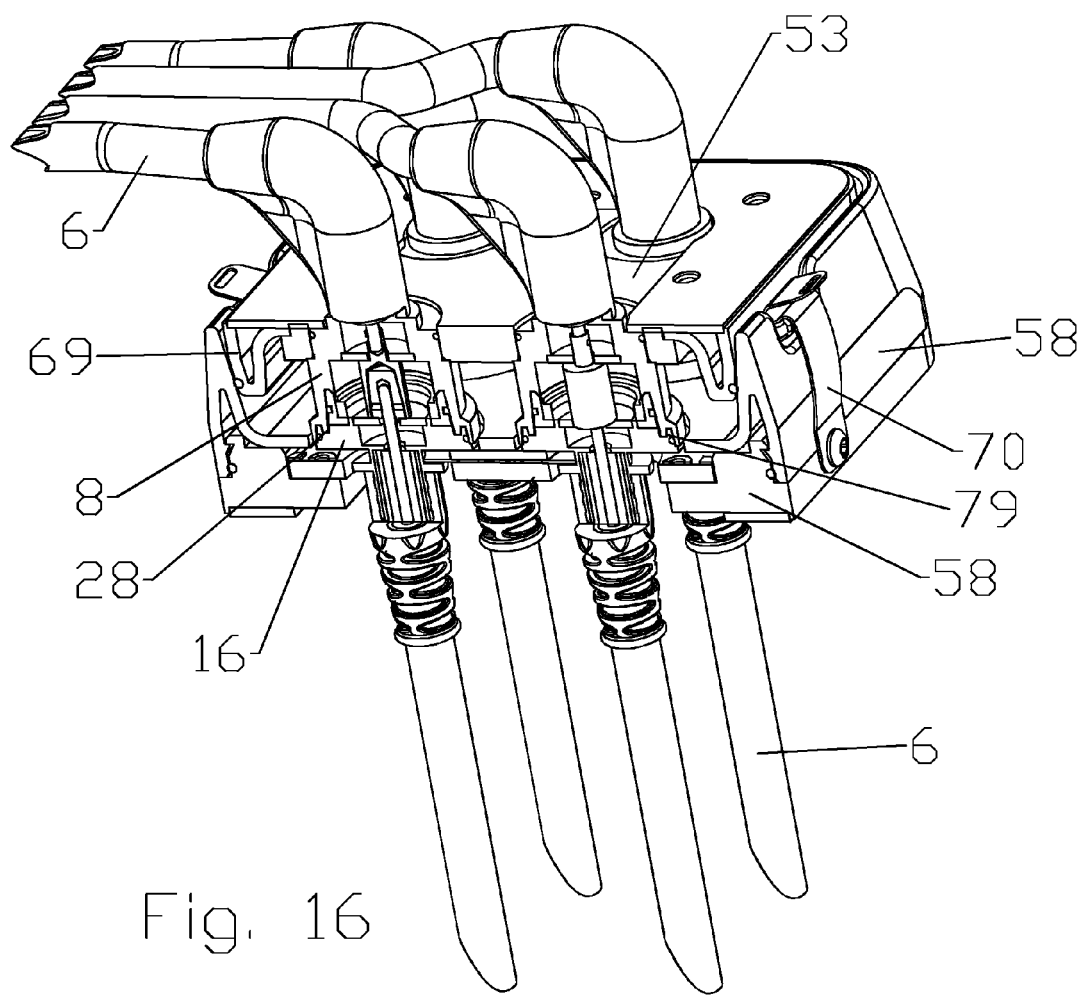
FIG. 16 is a schematic partial cut-away view of the four connector embodiment of FIG. 15, in the interlocked position.
Figure 17:
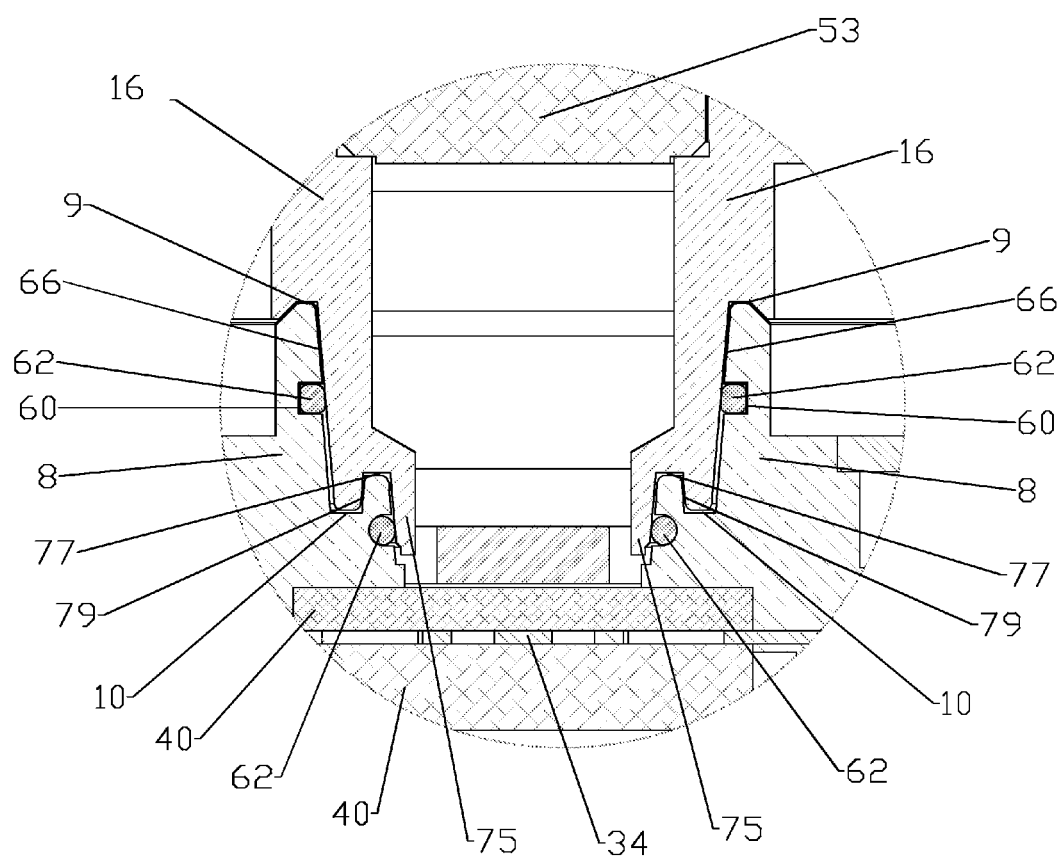
FIG. 17 is a schematic close-up view of a portion of FIG. 16.
Figure 18A:
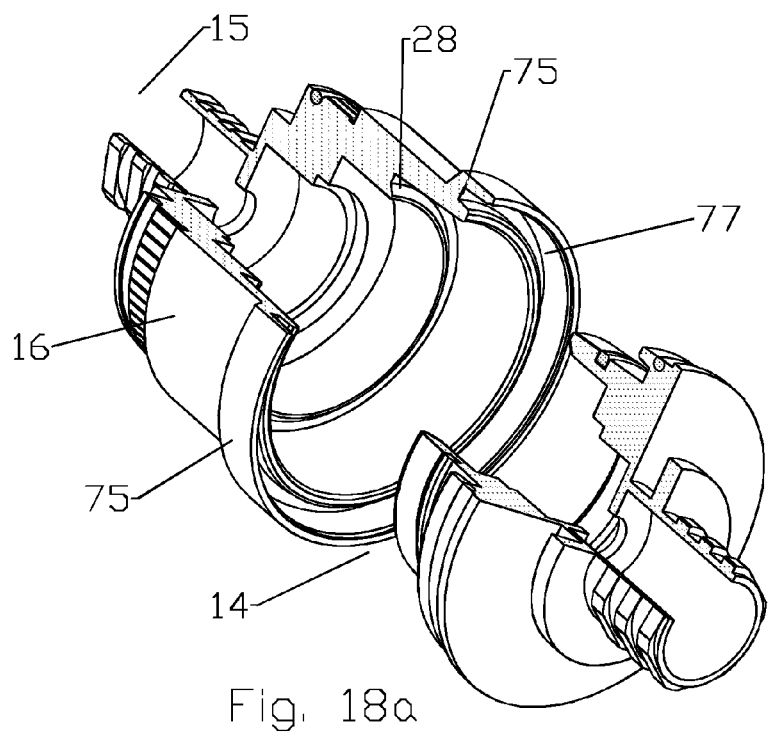
FIG. 18a is a schematic isometric quarter-section view of the male and female connector body portions of the four connector embodiment of FIG. 15, positioned for interconnection.
Figure 18B:
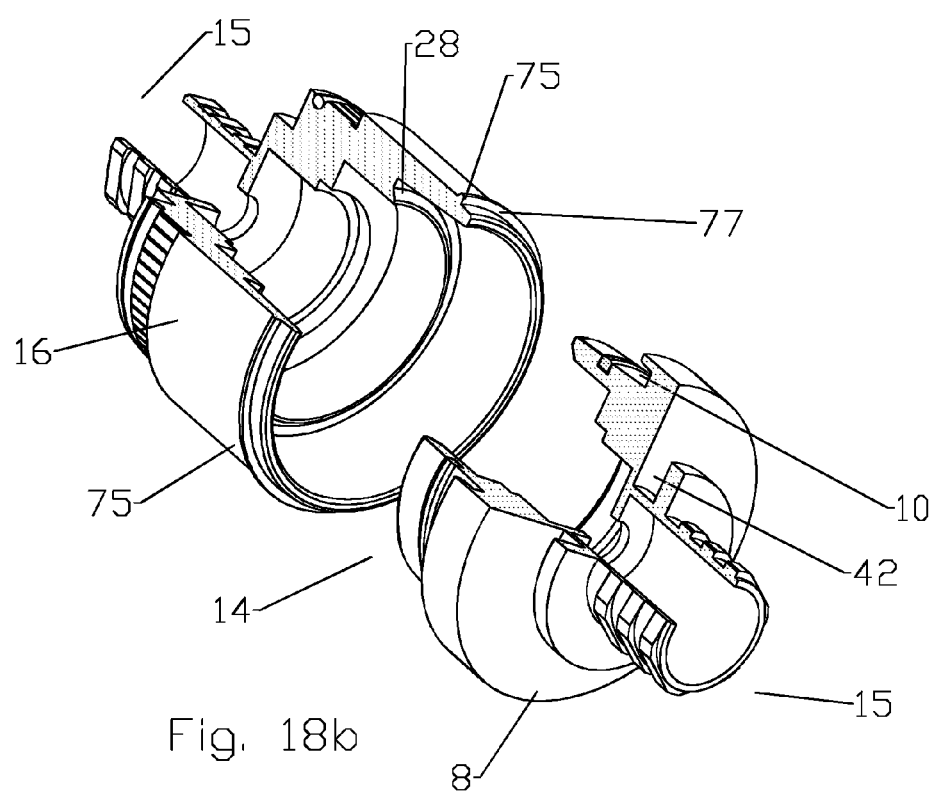
FIG. 18b is a schematic isometric quarter-section view of the male and female connector body portions of an alternative male and female connector body portion pair, positioned for interconnection.
Figure 19A:
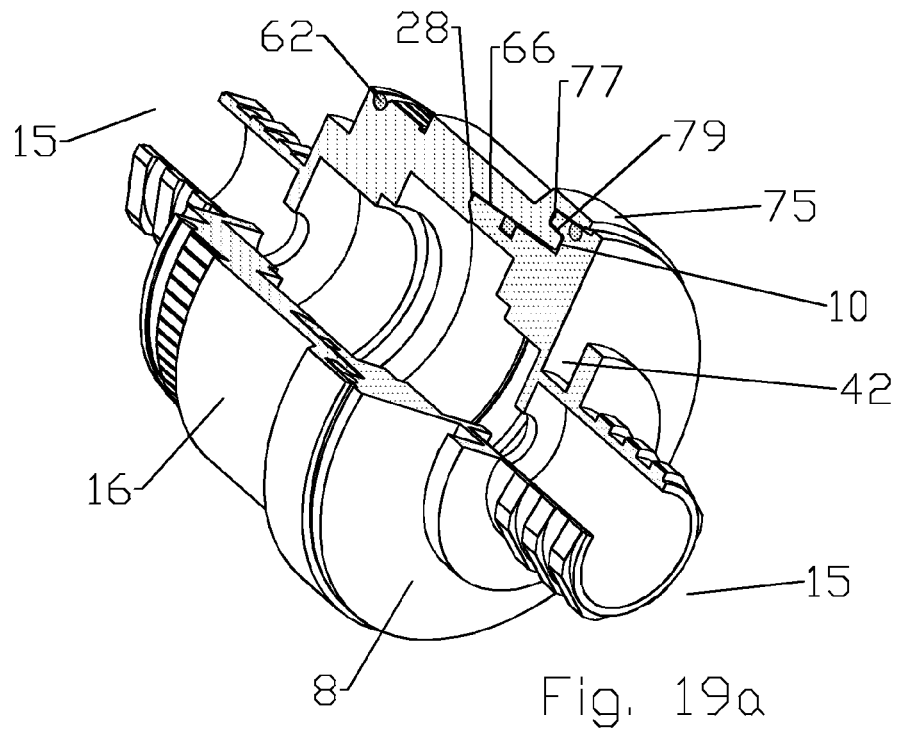
FIG. 19a is a schematic isometric quarter-section view of the male and female connector body portions of the four connector embodiment of FIG. 15, interconnected.
Figure 19B:
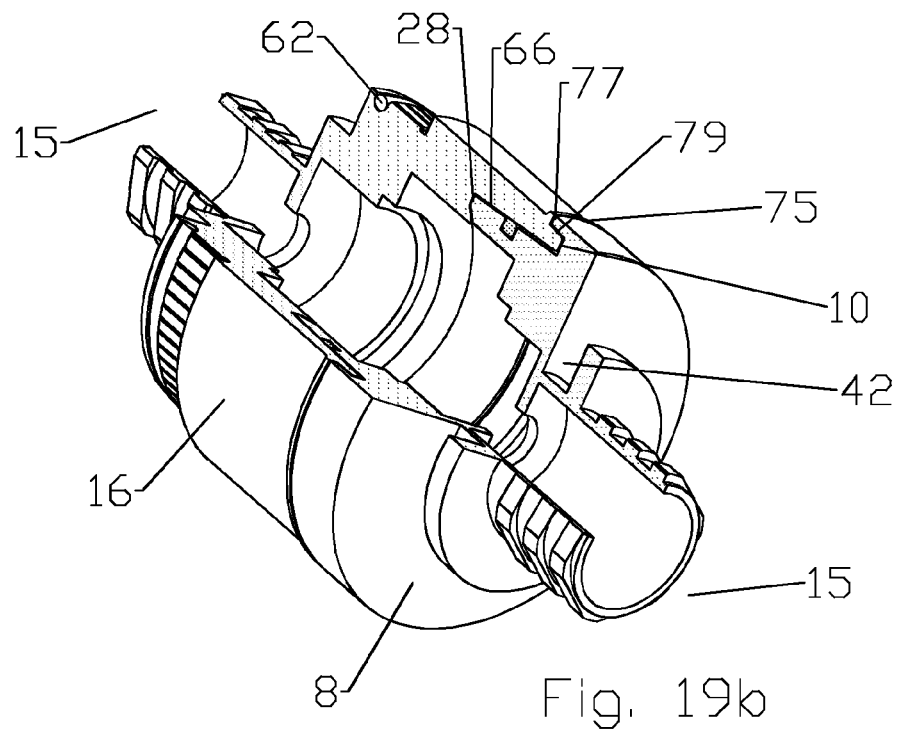
FIG. 19b is a schematic isometric quarter-section view of the male and female connector body portions of FIG. 18a, interconnected.

An exemplary close-quarters four connector embodiment with additional RF isolation features is demonstrated in FIGS. 15-19. An S-bend 79, in a radial direction between peripheral surfaces of the interconnection, introduces at least three 90 degree or less bends into the waveguide path as demonstrated in FIGS. 18*a* and 19*a* and at least four 90 degree or less bends as demonstrated in FIGS. 18*b* and 19*b*. An S-bend 79 may be formed, for example as best shown in FIGS. 17-19, by the peripheral groove 10, in cooperation with a peripheral flange 75 of the female portion 16 which forms an s-bend groove 77 open to the interface end 14 of the female portion 16. With an outer diameter sidewall of the peripheral groove 10 adjacent an inner diameter sidewall of the s-bend groove 77, the waveguide path 73 therebetween becomes an S-bend 79.

One skilled in the art will appreciate that some of the bends comprising the S-bend 79 may be provided as less than 90 degrees to enable a taper in the corners of the peripheral groove and/or s-bend grooves, for ease of meshing these surfaces into the final spaced apart orientation in the interconnected position.

Use of front and back stop plates 40 in a sandwich configuration around the float plate 34 is also demonstrated by FIGS. 15-17. Addition of a front stop plate 40 reinforces the float plate 34, for example, during disconnect movement, wherein environmental gaskets may grip the several male portions 8 with significant force that may otherwise deform a float plate 34 that is unsupported in the forward direction.

The front and back stop plates 40 may be oriented with their shoulder slots 41 oriented ninety degrees from one another for increased strength. Each of the stop plates 40 may be rotated slightly in reverse directions to temporarily align each for insertion of the male portion retention groove 42 along the several slots simultaneously, before returning each to its steady state orientation, locking the male portion 8 with respect to the stop plates 40.

Figure 20:
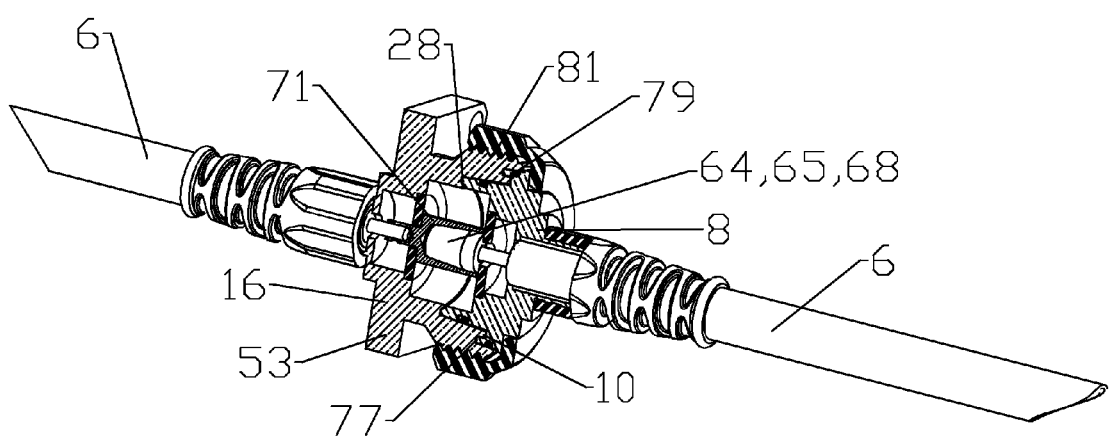
FIG. 20 is a schematic isometric cut-away side view of a static interconnection retention alternative embodiment with an S-bend for RF isolation.

The S-bend 79 may be similarly applied to capacitive coupling coaxial connectors with conventional static interconnection retentions, for example as shown in FIG. 20, where a polymer coupling nut 81 secures the interconnection, to obtain the benefit of improved RF isolation.

In the blind mate configurations, the range of radial movement enables the male portion(s) 8 to adapt to accumulated dimensional variances between linkages, mountings and/or associated interconnections such as additional ganged connectors, enabling, for example, swing arm blind mating between one or more male portions 8 and a corresponding number of female portions 16. Further, the generally conical mating surfaces provide an additional self-aligning seating characteristic that increases a minimum sweep angle before interference occurs, for example where initial insertion during mating is angled with respect to a longitudinal axis of the final interconnection, due to swing arm based arc engagement paths.

The application of capacitive coupling to male and female portions 8, 16 which may themselves be provided with molecular bond interconnections with continuing conductors, can enable a blind mateable quick connect/disconnect RF circuit that may be entirely without PIM.

| | Table of Parts |
|---|---|
| 8 | male portion |
| 9 | male outer conductor coupling surface |
| 10 | peripheral groove |
| 11 | stop shoulder |
| 12 | seat surface |
| 14 | interface end |
| 15 | cable end |
| 16 | female portion |
| 28 | annular groove |
| 30 | outer sidewall |
| 32 | bias web |
| 34 | float plate |
| 36 | support arm |
| 38 | bias web slot |
| 40 | shoulder plate |
| 41 | shoulder slot |
| 42 | retention groove |
| 43 | connector aperture |
| 44 | outer conductor |
| 46 | inner sidewall |
| 48 | bore |
| 50 | flare surface |
| 53 | mounting flange |
| 55 | support |
| 58 | overbody |
| 60 | seal groove |
| 62 | seal |
| 63 | inner conductor |
| 64 | inner conductor cap |
| 65 | male inner conductor coupling surface |
| 66 | outer conductor dielectric spacer |
| 68 | inner conductor dielectric spacer |
| 69 | base |
| 70 | retainer |
| 71 | inner conductor contact |
| 73 | waveguide path |
| 75 | peripheral flange |
| 77 | S-bend groove |
| 79 | S-bend |
| 81 | coupling nut |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A connector with a capacitively coupled connector interface for interconnection with a female portion provided with an annular groove, with a sidewall, open to an interface end of the female portion, comprising:

a male portion provided with a male outer conductor coupling surface at an interface end;

the male outer conductor coupling surface covered by an outer conductor dielectric spacer;

the male outer conductor coupling surface dimensioned to seat, spaced apart from the sidewall by the outer conductor dielectric spacer, within the annular groove, when the male portion and the female portion are in an interlocked position; and a waveguide path between the male outer conductor coupling surface and the female portion, while in the interlocked position, extends from the outer conductor dielectric spacer to an exterior of the interconnection through an S-bend in a radial direction.

2. The connector of claim 1, wherein the S-bend has at least three generally ninety degree or less bends.

3. The connector of claim 1, wherein the s-bend passes between an S-bend groove of the female portion and a peripheral groove of the male portion; an outer diameter sidewall of the peripheral groove adjacent an inner diameter sidewall of the S-bend groove.

4. The connector of claim 1, wherein the male portion is retained with a range of radial movement, with respect to a longitudinal axis of the male portion, by a bias web of a float plate; and
a coupling between the float plate and the female portion retains the male portion and the female portion in the interlocked position.

5. The connector of claim 4, further including a back shoulder plate provided on a cable end side of the float plate, the back shoulder plate dimensioned to inhibit movement of the male portion toward a cable end of the back shoulder plate and enabling the range of radial movement.

6. The connector of claim 5, further including a front shoulder plate provided on an interface side of the float plate, the front shoulder plate dimensioned to inhibit movement of the male portion toward an interface end of the front shoulder plate and enabling the range of radial movement.

7. The connector of claim 6, wherein the front shoulder plate has a shoulder slot dimensioned to receive a cable coupled to the male portion and a proximal end of the shoulder slot has a connector seat dimensioned to receive a cable end of the male portion.

8. The connector of claim 6, wherein a shoulder slot of the front shoulder plate and a shoulder slot of the back shoulder plate are oriented normal to one another.

9. The connector of claim 4, wherein the coupling between the float plate and the female portion is at least one clip coupled to the overbody that releasably engages the base.

10. The connector of claim 4, wherein the male portion is provided with an outer diameter retention groove and the float plate is provided with a bias web slot; the retention groove dimensioned to receive the float plate along the bias web slot, seating the male portion within the bias web.

11. The connector of claim 10, wherein the bias web is three support arms positioned generally equidistant from one another, the bias web slot provided between two of the support arms.

12. The connector of claim 4, wherein the at least one male portion is four male portions, the bias web provided as four portions of the float plate, each portion corresponding to one of the male portions; and;
the at least one female portion provided as four female portions with a monolithic base flange.

13. The connector of claim 12, wherein the male portions are arranged in a single row.

14. The connector of claim 12, wherein the male portions are arranged in a plurality of rows.

15. The connector of claim 4, wherein the bias web is three circuitous support arms positioned generally equidistant from one another.

16. The connector of claim 1, further including an annular groove provided in the male outer conductor coupling surface, in which a seal is seated.

17. The connector of claim 1, further including a male inner conductor surface at the interface end of the male portion;
an inner conductor dielectric spacer covering the male inner conductor surface;
the male inner conductor surface spaced apart from a female inner conductor surface at the interface end of the female portion, coaxial with the annular groove, by the inner conductor dielectric spacer, when the male portion and the female portion are in the interlocked position.

18. The connector of claim 17, wherein the male inner conductor surface is conical.

19. The connector of claim 1, wherein the male portion is provided with a peripheral groove, open to the interface end; the peripheral groove dimensioned to receive an outer diameter of the female portion.

20. A method for manufacturing a connector according to claim 1, comprising the steps of:
forming the outer conductor dielectric spacer as a layer of ceramic material upon the outer conductor coupling surface.

* * * * *